US 9,641,548 B2

(12) United States Patent
Hentunen

(10) Patent No.: US 9,641,548 B2
(45) Date of Patent: May 2, 2017

(54) SYSTEM AND METHOD FOR DETECTING AND PROTECTING AGAINST MALICIOUS

(71) Applicant: F-Secure Corporation, Helsinki (FI)

(72) Inventor: Daavid Hentunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 72 days.

(21) Appl. No.: 14/612,679

(22) Filed: Feb. 3, 2015

(65) Prior Publication Data

US 2016/0226889 A1  Aug. 4, 2016

(51) Int. Cl.
*G06F 11/00* (2006.01)
*G06F 17/30* (2006.01)
*H04L 29/06* (2006.01)
*G06F 21/54* (2013.01)

(52) U.S. Cl.
CPC ............ *H04L 63/145* (2013.01); *G06F 21/54* (2013.01)

(58) Field of Classification Search
CPC ............ H04L 63/1416; H04L 63/1425; H04L 63/1441; H04L 63/145; G06F 21/121
USPC ............................. 726/22–27; 713/187–188
See application file for complete search history.

(56) References Cited

U.S. PATENT DOCUMENTS

| | | | |
|---|---|---|---|
| 5,983,348 A | 11/1999 | Ji | ................................. 713/200 |
| 6,272,641 B1 | 8/2001 | Ji | ................................. 713/201 |
| 6,735,700 B1 * | 5/2004 | Flint | ........................ G06F 21/56 |
| | | | 713/188 |
| 8,141,154 B2 * | 3/2012 | Gruzman | ............... G06F 21/562 |
| | | | 713/188 |
| 8,156,559 B2 * | 4/2012 | Chen | .................... G06F 11/3608 |
| | | | 713/187 |
| 8,156,566 B2 * | 4/2012 | Lim | ...................... G06F 21/6218 |
| | | | 713/167 |
| 8,793,797 B2 * | 7/2014 | Meenakshisundaram | .. G06F 12/1483 |
| | | | 707/803 |
| 9,055,093 B2 * | 6/2015 | Borders | ................ G06F 21/552 |

* cited by examiner

*Primary Examiner* — Hosuk Song
(74) *Attorney, Agent, or Firm* — Harrington & Smith

(57) ABSTRACT

The invention relates to computer security and to systems and methods for detecting and protecting against malicious content such as computer viruses. Gateway (200) and security (400) computers for protecting a client computer (300) against dynamically generated malicious content. The gateway computer includes: a receiver configured to receive original content, the original content including a call to an original function, the call including an associated input. The gateway computer further includes: a content modifier unit configured to modify the original content to produce modified content, wherein the modified content includes at least a portion of the original content and a call to a shielding function, the shielding function being operable to cause the client computer to transmit an instruction to a security computer (400) to inspect the input associated with the call to the original function. The gateway computer further includes: a transmitter configured to transmit the original content to the security computer and to transmit the modified content to the client computer, thereby allowing, based on the original content, detection of dynamically generated malicious content.

24 Claims, 7 Drawing Sheets

SYSTEM AND METHOD FOR DETECTING AND PROTECTING AGAINST MALICIOUS

TECHNICAL FIELD

The invention relates to computer security. In particular, the invention relates to systems and methods for detecting and protecting against malicious content such as computer viruses. The malicious content may comprise dynamically generated malicious content and/or content that can cause malicious content to be generated dynamically.

BACKGROUND

Malware is a term used to describe malicious software. Malware consists of any malicious software used to disrupt computer operation, gather information unlawfully and/or gain access to private computers and computer systems. Malware is created intentionally to cause disruption and/or harm to computers, systems and their users. Examples of malware include: computer viruses, worms, Trojan horses and spyware.

Malware has become prevalent in modern times with the rise of the Internet. The Internet provides a tool for hackers and individuals to distribute malware to computers and computer systems. Unsuspecting computer users may fall victim to malware and its unfavourable effects. For example, malware present on a user's computer may cause sensitive information stored on that computer to be accessed by a third party and/or all or some of the functions of the computer to be restricted or damaged. Typically, hackers create malware so that themselves or others can attack and disrupt computer users and steal personal, financial or business information.

A computer virus is a malware program or piece of computer code. Viruses typically, once present on a computer and executed, replicate themselves in other computer programs on the computer. Areas of a computer's memory occupied by a computer virus or malware are said to be 'infected'.

The term malicious content as used herein covers any software that constitutes malware. For the sake of brevity, malware shall also be used herein to describe "badware": any software that arises by accident and is detrimental to a computer. An example of badware is a bug in a software application.

At present, two main categories of malware protection are available to protect computers from malicious content. The first category of protection is known as "reactive" protection. The second category of protection is known as "proactive" protection.

Reactive anti-malware applications are based on databases of known malware. Typically, a reactive anti-malware application will scan a computer for any malware that is present in a database of known malware. If a piece of known malware is identified on the computer or a signature of malware is detected, these can be isolated and dealt with by the application accordingly.

Reactive anti-malware applications are primarily based only on malware that is known to exist. Therefore, they offer little or no protection against malware that has yet to be discovered. In contrast, proactive anti-malware applications can analyse content for the presence of malware. Such applications may scan computer content for known virus signatures and perform "behavioural analysis" to analyse computer content for the presence of malware. Any computer content that appears suspicious may be flagged so it can be scanned and analysed in greater detail before appropriate action is taken by the anti-malware application.

A gateway security application may be put in place to scan content for malware before allowing it to be delivered to its intended destination. Such a gateway security application may be implemented on a security computer, which may act as an intermediary between a client computer, the internet or any third parties that deliver content to the client computer. In other words, the gateway computer may shield content before it is delivered to its intended destination. Gateway security applications typically utilise reactive methodologies in detecting and protecting against malware; however, certain systems including a gateway computer may utilise proactive methodologies.

Reactive and proactive anti malware applications may be used in combination to combat malware. However, dynamically generated viruses pose a new threat in the field of malicious content. Dynamically generated viruses are a type of malware that is created only at runtime. Dynamically generated viruses are difficult to detect early on using the conventional methods described above. Dynamically generated viruses pose a particular problem in implementing gateway-level malware protection, as gateway security applications will typically only scan content before it is executed on a client computer. Further, gateway-level malware protection may only use reactive protection methodologies.

Proactive anti-malware applications may run directly on a client computer to protect it from dynamically generated malicious content. However, such applications have potential to become widely available to the creators of malware and may be susceptible to reverse-engineering. Further, proactive anti-malware applications running directly on a client system will have to be installed on that system. Installation of an anti-malware application on a client system may take up valuable computational resources. There is no guarantee that anti-malware applications present on a client computer will be able provide comprehensive protection against dynamically generated malicious content.

There is need for a new form of anti-malware application which does not operate on the computer being protected or shielded, but which can capture any content that may enable dynamically generated malicious content to be generated on the computer.

U.S. Pat. No. 6,272,641 and U.S. Pat. No. 5,983,348 describe network scanners for security checking of application programs. Both documents disclose a network scanner for security checking of application programs (e. g. Java applets or Active X controls) received over the Internet or an Intranet that has both static (pre-run time) and dynamic (run time) scanning.

U.S. Pat. No. 8,141,154 concerns systems and methods for protecting computers against dynamically generated malicious code. A system for protecting a computer from dynamically generated malicious executable code is disclosed in the document. Three major components of the system are a gateway computer, a client computer and a security computer.

SUMMARY OF THE INVENTION

According to the invention in a first aspect, there is provided a gateway computer for protecting a client computer against dynamically generated malicious content. The gateway computer comprises a receiver configured to receive original content, the original content comprising a call to an original function, the call including an associated input. The gateway computer further comprises a content modifier unit configured to modify the original content to produce modified content, wherein the modified content comprises a call to the original function and a call to a shielding function, the shielding function being operable to cause the client computer to transmit an instruction to a security computer to inspect the input associated with the call to the original function. The gateway computer further comprises a transmitter configured to transmit the original content to the security computer and to transmit the modified content to the client computer, thereby allowing, based on the original content, detection of dynamically generated malicious content.

Optionally, the shielding function is operable to identify the input associated with the call to the original function.

Optionally, the shielding function in the modified content is operable to cause processing of the modified content in the client computer to be suspended prior to invoking the call to the original function.

Optionally, the shielding function in the modified content is operable to cause the client computer to transmit an instruction to the security computer to determine and indicate to the client computer whether it is safe for the client computer to invoke the call to the original function, the determination being based on the original content and the input associated with the call to the original function.

Optionally, the shielding function in the modified content is operable to cause the client computer to transmit to the security computer the input associated with the call to the original function.

Optionally, the shielding function in the modified content is operable to cause the client computer to receive an indication from the security computer on whether it is safe for the client computer to invoke the call to the original function.

Optionally, the shielding function in the modified content is operable to cause the client computer, in response to receiving an indication from the security computer that it is safe for the client computer to invoke the call to the original function, to resume processing of the modified content.

Optionally, the shielding function in the modified content is operable to cause the client computer, in response to receiving an indication from the security computer that it is not safe for the client computer to invoke the call to the original function, to resume processing of the modified content without invoking the call to the original function or to cancel processing of the modified content.

Optionally, the shielding function is operable to cause the client computer, in response to receiving an indication from the security computer that it is not safe for the client computer to invoke the call to the original function, to further modify the modified content to make the call to the original function benign. For example, if original function is operable to visit a malicious URL as an input, the input for the original function can be modified to point to a safe website that may warn the user.

Optionally, the modified content is operable, to cause the client computer to transmit updated original content to the security computer.

Optionally, the original content comprises calls to a plurality of original functions, and the modified content is operable to cause the client computer to transmit updated original content to the security computer.

According to the invention in a second aspect, there is provided a security computer for detecting dynamically generated malicious content. The security computer comprises a receiver configured to receive original content from a gateway computer, the original content comprising a call to an original function, the call including an associated input. The security computer further comprises a memory for storing the original content; and a content inspector unit configured, based on the original content and the input associated with the call to the original function, to determine whether it is safe for a client computer to invoke the call to the original function. The security computer further comprises a transmitter configured to transmit an indication to the client computer specifying whether it is safe for the client computer to invoke the call to the original function.

Optionally, the receiver is further configured to receive an instruction from the client computer to determine whether it is safe for the client computer to invoke the call to the original function.

Optionally, the content inspector unit is further configured to scan the input associated with the call to the original function for the presence of calls to additional functions or any dynamically generated function calls resulting from the input.

Optionally, the security computer further comprises a content updater unit configured, based the call to the original function, to determine updated original content.

Optionally, the receiver is further configured to receive updated original content from the client computer.

Optionally, the original content comprises calls to a plurality of original functions and the receiver is configured to receive updated original content from the client computer.

Optionally, the content inspector unit is further configured to determine whether any additional function calls or any dynamically generated function calls are present in updated original content and, if additional function calls or any dynamically generated function calls are present, to add corresponding shielding function calls to the updated original content.

Optionally, the content inspector unit is further configured, based on the updated original content and an input associated with a call to another original function, to determine whether it is safe for the client computer to invoke the call to the other original function.

Optionally, in determining whether it is safe for a client computer to call the original function, the content inspector unit is configured to retrieve a security policy.

Optionally, the security policy comprises a list of potentially malicious operations and the content inspector unit is configured to identify such potentially malicious operations in the call to the original function and the original content.

Optionally, the content inspector unit is configured to determine whether there are any differences between updated original content received from the client computer and updated original content determined by the content modifier unit and wherein the receiver is further configured to receive updated original content from the client computer.

Optionally, if it is determined that there are differences between the updated content received from the client computer and updated original content determined by the content modifier unit, the content inspector unit is configured to determine new updated original content.

According to the invention in a third aspect, there is provided a method for operating a gateway computer for protecting a client computer against dynamically generated malicious content. The method comprises receiving, at a receiver, original content, the original content comprising a call to an original function, the call including an associated input. The method further comprises modifying, at a content modifier unit, the original content to produce modified content, wherein the modified content comprises a call to the original function and a call to a shielding function, the shielding function being operable to cause the client computer to transmit an instruction to a security computer to inspect the input associated with the call to the original function. The method further comprises transmitting, at a transmitter, the original content to the security computer and transmitting the modified content to the client computer, thereby allowing, based on the original content, detection of dynamically generated malicious content.

Optionally, the shielding function in the modified content comprises the call to the original function.

Optionally, the shielding function is operable to identify the input associated with the call to the original function.

Optionally, the shielding function in the modified content is operable to cause processing of the modified content in the client computer to be suspended prior to invoking the call to the original function.

Optionally, the shielding function in the modified content is operable to cause the client computer to transmit an instruction to the security computer to determine and indicate to the client computer whether it is safe for the client computer to invoke the call to the original function, the determination being based on the original content and the input associated with the call to the original function.

Optionally, the shielding function in the modified content is operable to cause the client computer to transmit to the security computer the input associated with the call to the original function.

Optionally, the shielding function in the modified content is operable to cause the client computer to receive an indication from the security computer on whether it is safe for the client computer to invoke the call to the original function.

Optionally, the shielding function in the modified content is operable to cause the client computer, in response to receiving an indication from the security computer that it is safe for the client computer to invoke the call to the original function, to resume processing of the modified content.

Optionally, the shielding function in the modified content is operable to cause the client computer, in response to receiving an indication from the security computer that it is not safe for the client computer to invoke the call to the original function, to resume processing of the modified content without invoking the call to the original function or to cancel processing of the modified content.

Optionally, the modified content is operable to cause the client computer to transmit original content updates to the security computer.

Optionally, the original content comprises calls to a plurality of original functions, and the modified content is operable to cause the client computer to transmit updated original content to the security computer.

According to the invention in a further aspect, there is provided a computer program comprising instructions which, when executed on at least one processor, cause the at least one processor to carry out the above method.

According to the invention in a further aspect, there is provided a carrier containing the computer program above, wherein the carrier is one of an electronic signal, optical signal, radio signal, or non-transitory computer readable storage medium.

According to the invention in a fourth aspect, there is provided a method for operating a security computer for detecting dynamically generated malicious content. The method comprises receiving, at a receiver, original content from a gateway computer, the original content comprising a call to an original function, the call including an associated input and storing, in a memory, the original content. The method further comprises determining, at a content inspector unit, based on the original content and the input associated with the call to the original function, whether it is safe for a client computer to invoke the call to the original function. The method further comprises transmitting, at a transmitter, an indication to the client computer specifying whether it is safe for the client computer to invoke the call to the original function.

Optionally, the method further comprises, at the receiver, an instruction from the client computer to determine whether it is safe for the client computer to invoke the call to the original function.

Optionally, the method further comprises, scanning, at the content inspector unit, the input associated with the call to the original function for the presence of calls to additional functions or any dynamically generated function calls resulting from the input.

Optionally, the method further comprises, determining, at a content updater unit, updated original content based the call to the original function and the original content.

Optionally, the method further comprises, receiving, at the receiver, updated original content from the client computer.

Optionally, the original content comprises calls to a plurality of original functions and the method further comprises receiving, at the receiver, updated original content from the client computer.

Optionally, the method further comprises, determining, at the content inspector unit, whether any additional function calls or any dynamically generated function calls are present in updated original content and, if additional function calls or any dynamically generated function calls are present, adding corresponding shielding function calls to the updated original content.

Optionally, the method further comprises, determining, at the content inspector unit, based on the updated original content and an input associated with a call to another original function, whether it is safe for the client computer to invoke the call to the other original function.

Optionally, the method further comprises, retrieving, at the content inspector unit, a security policy in determining whether it is safe for a client computer to call the original function.

Optionally, the security policy comprises a list of potentially malicious operations and further comprising identifying, at the content inspector unit, such potentially malicious operations in the call to the original function and the original content.

Optionally, the method further comprises, determining, at the content inspector unit, whether there are any differences between updated original content received from the client computer and updated original content determined by the content modifier unit.

Optionally, the method further comprises, if it is determined that there are differences between the updated content received from the client computer and updated original content determined by the content modifier unit, determining, at the content updater unit, new updated original content.

According to the invention in a further aspect, there is provided a computer program comprising instructions which, when executed on at least one processor, cause the at least one processor to carry out the above method.

According to the invention in a further aspect, there is provided a carrier containing the computer program above, wherein the carrier is one of an electronic signal, optical signal, radio signal, or non-transitory computer readable storage medium.

According to the invention in a fifth aspect, there is provided a client computer for protecting against dynamically generated malicious content. The client computer comprises a receiver configured to receive modified content from a gateway computer, wherein the modified content includes a call to an original function, including an associated input, and a call to a shielding function. The client computer further comprises a content processor for processing the modified content comprising invoking the call to the shielding function and the original function. The client computer further comprises a transmitter configured, before the content processor invokes the call to the original function and following the invocation of the call to the shielding function, to transmit an instruction to a security computer to inspect the input associated with the call to the original function. The content processor is further configured, based on the call to the original function, to determine updated original content. The transmitter is further configured to transmit, to the security computer, the updated original content.

Optionally, the content processor is configured to suspend processing of the modified content prior to the transmitter transmitting the instruction to the security computer.

Optionally, the receiver is further configured to receive an indication from the security computer specifying whether it is safe for the client computer to invoke the call to the original function.

Optionally, the content processor is configured, in response to the receiver receiving an indication from the security computer that it is safe for the client computer to invoke the call to the original function, to resume processing of the modified content.

Optionally, upon the receiver receiving an indication from the security computer specifying that it is safe for the content processor to invoke the call to the original function, the content processor is configured to invoke the call to the original function.

Optionally, the content processor is configured, in response to the receiver receiving an indication from the security computer that it is not safe for the client computer to invoke the call to the original function, to resume processing of the modified content without invoking the call to the original function or to cancel processing of the modified content.

Optionally, the content processor is further configured to scan the input associated with the call to the original function for the presence of calls to additional functions or any dynamically generated function calls resulting from the input.

Optionally, the content processor is further configured to determine whether any additional function calls or any dynamically generated function calls are present in updated original content and, if additional function calls or any dynamically generated function calls are present, to add corresponding shielding function calls to the updated original content.

According to the invention in a sixth aspect, there is provided a method for operating a client computer for protecting against dynamically generated malicious content. The method comprises receiving, at a receiver, modified content from a gateway computer, wherein the modified content includes a call to an original function, including an associated input, and a call to a shielding function. The method further comprises processing, at a content processor, the modified content, the processing comprising invoking the call to the shielding function and the call to the original function. The method further comprises transmitting, at a transmitter, configured, before the invoking the call to the original function and following the invocation of the call to the shielding function, an instruction to a security computer to inspect the input associated with the call to the original function. The method further comprises determining, at the content processor, updated original content based on the call to the original function. The method further comprises transmitting, at the transmitter, to the security computer, updated original content.

Optionally, the method further comprises, suspending, at the content processor, processing of the modified content prior to invoking the call to the original function Optionally, the method further comprises, receiving, at the receiver, an indication from the security computer specifying whether it is safe for the client computer to invoke the call to the original function.

Optionally, the method further comprises, resuming, at the content processor, processing of the modified content in response to the receiver receiving an indication from the security computer that it is safe for the client computer to invoke the call to the original function.

Optionally, the method further comprises, invoking, at the content processor, the call to the original function in response to the receiver receiving an indication from the security computer specifying that it is safe for the content processor to invoke to call to the original function.

Optionally, the method further comprises, in response to the receiver receiving an indication from the security computer that it is not safe for the client computer to invoke the call to the original function, resuming processing of the modified content without invoking the call to the original function or cancelling processing of the modified content.

Optionally, the method further comprises, scanning, at the content processor, the input associated with the call to the original function for the presence of calls to additional functions or any dynamically generated function calls resulting from the input.

Optionally, the method further comprises, determining, at the content processor, whether any additional function calls or any dynamically generated function calls are present in updated original content and, if additional function calls or any dynamically generated function calls are present, adding corresponding shielding function calls to the updated original content.

According to the invention in a further aspect, there is provided a computer program comprising instructions which, when executed on at least one processor, cause the at least one processor to carry out the above method.

According to the invention in a further aspect, there is provided a carrier containing the computer program above, wherein the carrier is one of an electronic signal, optical signal, radio signal, or non-transitory computer readable storage medium.

BRIEF DESCRIPTION OF THE DRAWINGS

Exemplary embodiments of the invention will now be described with reference to the accompanying drawings, in which.

DETAILED DESCRIPTION

Figure 1:
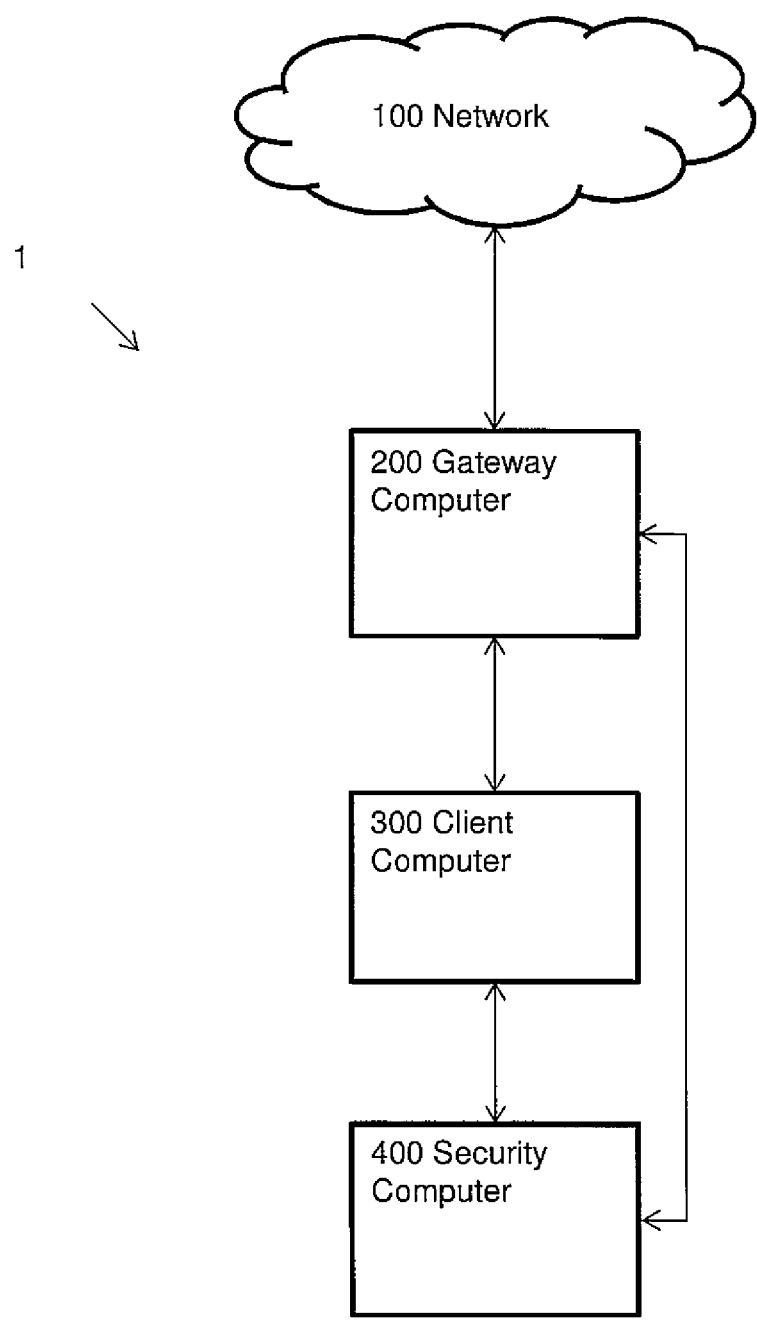
FIG. 1 is an architecture diagram for a system for detecting and protecting against malicious content.

Disclosed herein are systems and methods for detecting and protecting against malicious content such as computer viruses. The malicious content may comprise dynamically generated malicious content or content that can cause malicious content to be generated dynamically. For the sake of clarity, content that can cause malicious content to be generated dynamically can also be considered to be malicious content.

Generally disclosed herein are methods and systems that involve a gateway computer, a client computer and a security computer. The methods and systems may involve a client computer and a gateway computer which also acts as a security computer. The gateway computer may comprise the security computer. A gateway computer can be configured to receive original content from a network or the Internet, and transmit the content to other computers For execution. Before transmitting the content, the gateway computer may modify the content. A client computer may be configured to request and receive content from a gateway computer and process the content. A security computer may be configured to receive content from a gateway computer or a client computer. The security computer may scan the content for malicious content and/or process the content. The security computer may transmit indications on whether the content is safe for other computers to run.

The methods and systems disclosed herein relate to gateway security applications. In particular, the methods and systems enable the detection and capture of original content that is destined for a client computer and that may result in malicious content being generated dynamically in the client computer during runtime. Exemplary methods and systems require no change in functionality of a client computer. Exemplary methods and systems enable a client computer to be shielded from dynamically generated malicious content without any significant modifications needing to be made to the client computer. Instead, the methods can be implemented on a gateway computer and a security computer as will be described in more detail below. In other words, the gateway and security computers can serve a client computer, The inventor has appreciated that malicious content can be generated dynamically from original content during runtime. The malicious content may be generated as a result of a computer calling a series of functions present in the original content. In isolation, each function call may appear to be harmless. It may be far from evident that a call to a function is contributing toward the dynamic generation of malicious content. However, a function may alter the computer runtime environment in which the original content is being executed. Therefore, a series of calls to functions may alter the computer runtime environment significantly. A series of function calls may cause or enable malicious content to be generated and "infect" a computer. In other words, content that can cause malicious content (such as computer viruses) to be dynamically generated in a computer runtime environment may be disguised as a series of function calls in the original content. Conventional anti-malware applications may not detect the potential for malicious content to be generated in a client computer. Conventional anti-malware applications may scan each function and call to the function in isolation. Further, conventional anti-malware applications may be configured to scan functions and calls to functions away from the computer runtime environment in which they are being called or invoked.

To enable detection of content that may lead to dynamically generated malicious content, a security computer can be utilised to scan inputs of calls to functions that are present in original content. To protect a client computer, the security computer may scan an input to a call to a function prior to the call to the function call being invoked in the client computer. The security computer may transmit an indication to the client computer on whether it is safe to call the function with the associated input. Content transfer between the security computer and the client computer may comprise "Mobile Protection Code". Stated another way, features as described herein may use "Mobile Protection Code"; such as when content is transferred between the security computer and the client computer for example.

The inventor has also appreciated that a security computer can more effectively scan a call to a function and, in particular, an input associated with the call to the function if it is scanned "in context" with the computer runtime environment in which it is to be invoked on the client computer. By emulating the runtime environment of a client computer on a security computer, a security computer can gain a more accurate picture of how a series of function calls or the original content in general may effect a the client computer. For example, a series of functions may generate, in increments, a piece or JavaScript® that is to run on the client computer. Emulating the runtime environment of a client computer enables the security computer to more effectively scan content for the potential of creating dynamically generated malicious content in the client computer. It is possible, if the security computer emulates the computer runtime environment of a client computer exactly, that the security computer can be in a position to detect the presence of any content that may result in what is considered to be dynamically generated malicious content.

To emulate the runtime environment of the client computer effectively, the security computer may receive original content from a gateway computer. Further, any time that the client computer invokes a call to a function, it may transmit any updates to its runtime environment resulting from that function to the security computer. The security computer may then update its runtime environment accordingly, so that it emulates the environment of the client computer as accurately as possible. In addition, or alternatively, the security computer may also call functions present in the original content. Upon calling a function, the security computer may emulate the runtime environment of the client computer by implementing any updates to the runtime environment of the client computer resulting from the function.

Original content as referred to herein describes any content that is received from a network or the Internet and which has not been scanned or modified. For example, an application program that has been downloaded from the internet and stored in computer memory without any modification and without being scanned for malware would constitute original content. Original content may comprise original functions and/or calls to original functions. Original functions are functions that have not been scanned for malware and have not been modified. Calls to original functions are function calls that may comprise an associated input and which may require scanning for malware. The input associated with a call to an original function may require scanning for malware.

Modified content as referred to herein describes original content that has been received from a network or the internet and modified. Modified content may comprise the original content. Modified content may comprise shielding functions. Shielding functions are operable to prevent a computer from invoking a call to a function present in the original content before sending its input to a security computer for inspection.

FIG. 1 is an architecture diagram for an exemplary system 1 for detecting and protecting against malicious content. The system 1 comprises a gateway computer 200, a client computer 300, a security computer 400. Any connections between the system entities 200, 300, 400 and any connections between the entities 200, 300, 400 and the network 100. The system 1 is in electrical communication with a network 100. The gateway computer 200 is in electrical communication with the network 100. The gateway computer 200 communication is in electrical communication with the client computer 300. The client computer is in electrical communication with the security computer 400. The gateway computer 200 is in electrical communication with the security computer 400. The network 100 may be any network, such as a LAN, WAN, an intranet or the Internet.

FIG. 1 displays one network 100, one gateway computer 200, one client computer 300 and one security computer 400. However, a multitude of different devices and/or systems may be in electrical communication with the network 100. More than one network may be in electrical communication with the system 1. A plurality of gateway computers may connect to the network 100. A plurality of client computers and security computers may be integrated into the system 1 and interconnect with other entities in the system 1.

Figure 1A:
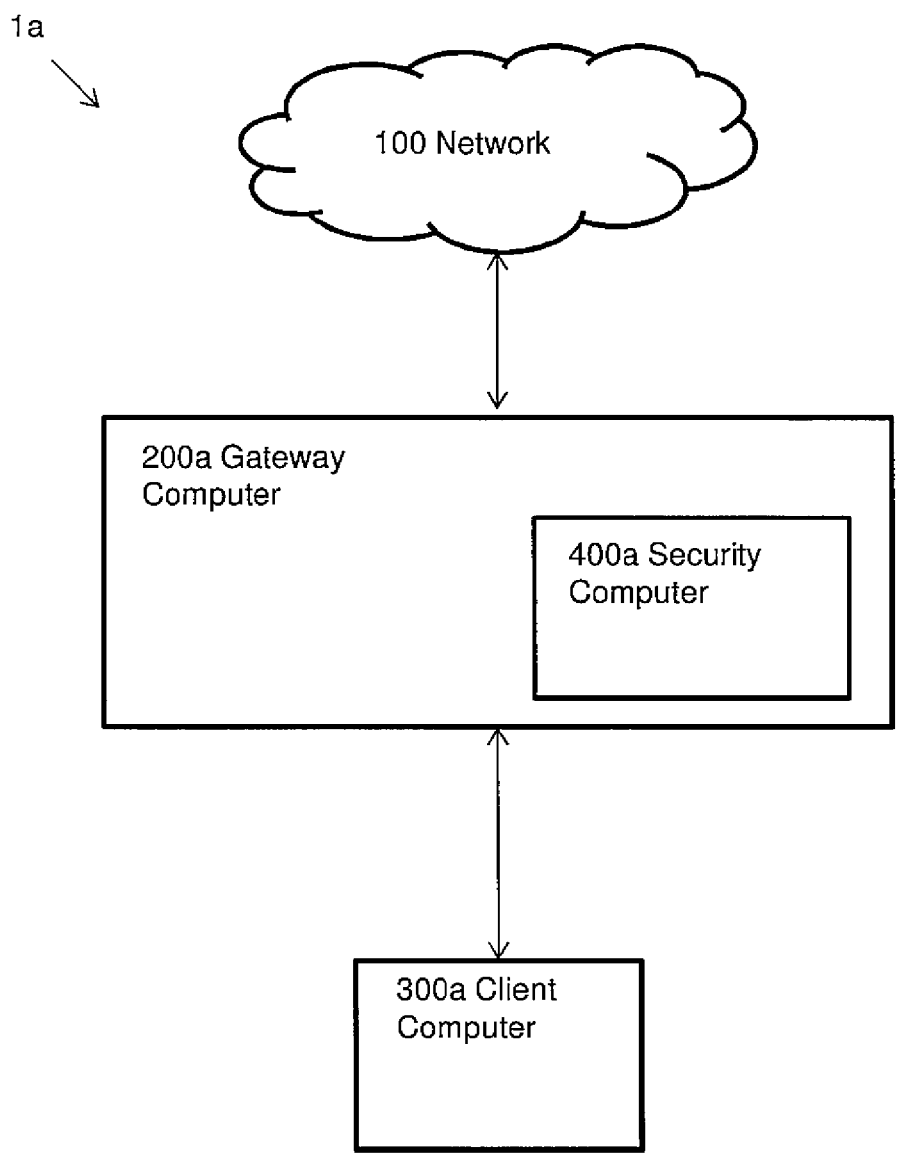
FIG. 1a is another architecture diagram for a system for detecting and protecting against malicious content.

FIG. 1a is an architecture diagram for another exemplary system 1a for detecting and protecting against malicious content. Like FIG. 1, FIG. 1a displays the network 100. A multitude of different devices and/or systems may be in electrical communication with the network 100. FIG. 1a also displays a gateway computer 200a which comprises the functionality of a security computer 400a. FIG. 1a also displays a client computer 300a. The system 1a comprises the gateway computer 200a, the client computer 300a and any connections between the system entities 200a, 300a and any connection and any connections between the entities 200a, 300a and the network 100. The system 1a is in electrical communication with the network 100. The gateway computer 200a is in electrical communication with the network 100. The gateway computer 200a communication is in electrical communication with the client computer 300a.

FIG. 1a displays one network 100, one gateway computer 200a and one client computer 300a. However, a multitude of different devices and/or systems may be in electrical communication with the network 100. More than one network may be in electrical communication with the system 1a. A plurality of gateway computers may connect to the network 100. A plurality of client computers and security computers may be integrated into the system 1a and interconnect with other entities in the system 1a.

In some exemplary systems, a gateway computer may be in electrical communication with a plurality of networks and/or a plurality of client computers. In some exemplary systems, a client computer may be in electrical communication with a plurality of gateway computers. Some exemplary systems may comprise a client computer and/or a gateway computer in electrical communication with a plurality of security computers.

It is noted that the term "electrical communication", unless otherwise stated, encompasses any one of wired and wireless electrical communication, or both. Therefore, electrical communication may be, for example, a network communication over a wired connection or a network communication of over a radio frequency connection, or both.

Figure 2:
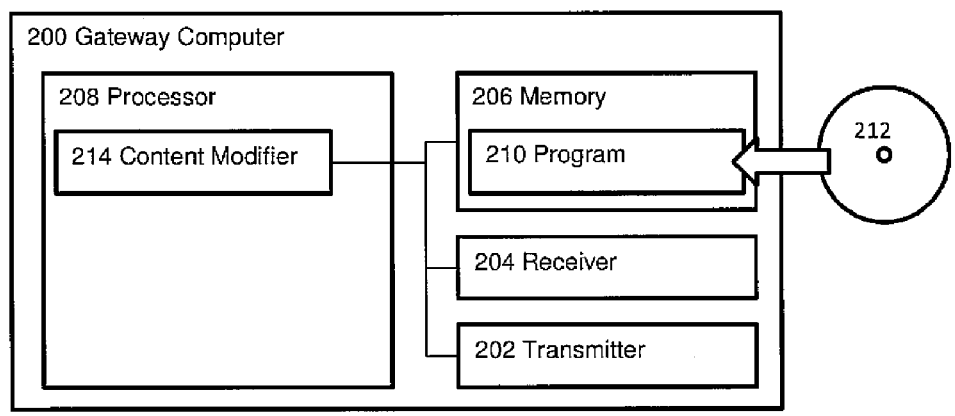
FIG. 2 is a block schematic diagram of a gateway computer.

FIG. 2 shows a block diagram displaying the exemplary gateway computer 200 of the system 1 of FIG. 1.

The gateway computer 200 may relay signals between the network 100 and the client computer 100. The gateway computer 200 may also relay signals between the network 100 and the security computer 400. The gateway computer 200 may be an intermediary between a network and a client and/or security computer. The gateway computer 200 may be an intermediary between any two entities of a system.

Other exemplary gateway computers may be in electrical communication with a plurality of client computers and/or may be capable of serving a plurality of client computers. Other exemplary gateway computers may be in electrical communication with a plurality of networks and/or may be capable of communicating with a plurality of networks.

The gateway computer 200 comprises a transmitter 202 and a receiver 204. The transmitter 202 and receiver 204 may be in electrical communication with other communication units, user equipments, servers and/or functions in the network 100, and are configured to transmit and receive data accordingly.

The gateway computer 200 preferably comprises a user interface (not shown) which assists a user in customizing its functionality and/or its stored content.

The gateway computer 200 further comprises a memory 206 and at least one processor 208. The memory 206 may comprise a non-volatile memory and/or a volatile memory. The memory 206 may have a computer program 210 stored therein. The computer program 210 may be configured to undertake the methods disclosed herein. The computer program 210 may be loaded in the memory 206 from a non-transitory computer readable medium 212, on which the computer program is stored. The processor 208 is configured to undertake at least the functions of a content modifier unit 214 as set out below.

Each of the transmitter 202 and receiver 204, memory 206, processor 208 and content modifier unit 214 is in electrical communication with the other features 202, 204, 206, 208, 210 and 214 of the gateway computer 200.

The gateway computer 200 can be implemented as a combination of computer hardware and software. In particular, the content modifier unit 214 may be implemented as software configured to run on the processor 208. The memory 206 stores the various programs/executable files that are implemented by a processor 208, and also provides a storage unit for any required data. The programs/executable files stored in the memory 206, and implemented by the processor 208, can include the content modifier unit 214, but is not limited to such.

The gateway computer 200 may comprise the functionality of a security computer as will be described below. The gateway computer 200 may be configured for use in a system the same as or similar to the exemplary system 1a of FIG. 1a.

The gateway computer 200 may comprise various functionalities in addition to the content modifier unit 214. The gateway computer 200 may be configured for multiple different purposes. The term "gateway computer" is not to be construed as a limitation. The gateway computers may be personal computers, business servers, portable computers or any other type of computers. The gateway computer provides an intermediate node between a network and a client computer and security computer. The functionality of the gateway computers described herein may be distributed on multiple system entities.

Figure 3:
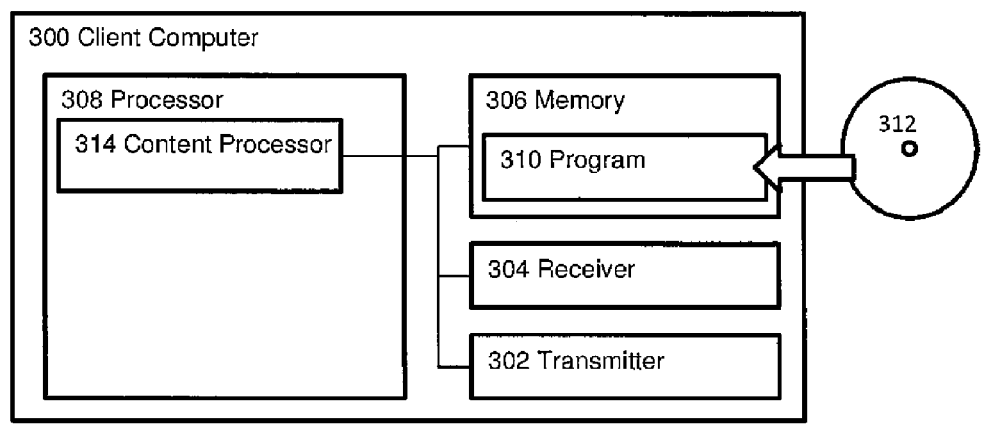
FIG. 3 is a block schematic diagram for a client computer.

FIG. 3 shows a block diagram displaying the exemplary client computer 300 of the system 1 of FIG. 1.

The client computer 300 may relay signals between the gateway computer 200 and the security computer 400. The client computer 300 may also relay signals between the network 100 and the security computer 400. The client computer 300 may be an intermediary between two entities of a system.

Other exemplary client computers may be in electrical communication with a plurality gateway computers and/or may be capable of being served by a plurality of gateway computers. Other exemplary client computers may be in electrical communication with a plurality of security computers and/or may be capable of communicating with a plurality of networks.

The client computer 300 comprises a transmitter 302 and a receiver 304. The transmitter 302 and receiver 304 may be in electrical communication with other communication units, user equipments, servers and/or functions in the network 100, and are configured to transmit and receive data accordingly.

The client computer 300 preferably comprises user interface (not shown) which assists a user in customizing its functionality and/or its stored content.

The client computer 300 further comprises a memory 306 and at least one processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake at least the functions of a content processor unit 314 as set out below.

Each of the transmitter 302 and receiver 304, memory 306, processor 308 and content processor unit 314 is in electrical communication with the other features 302, 304, 306, 308, 310 and 314 of the client computer 300.

The client computer 300 can be implemented as a combination of computer hardware and software. In particular, the content processor unit 314 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the content processor unit 314, but is not limited to such.

The client computer 300 may comprise various functionalities in addition to the content processor unit 314. The client computer 300 may be configured for multiple different purposes. The term "client computer" adds clarity to this description and is not to be construed as a limitation. The client computers may be personal computers, business servers, portable computers or any other type of computers. Essentially, a client computer can be any computer that needs protection from malicious content. The functionality of the client computers described herein may be distributed on multiple system entities.

Figure 4:
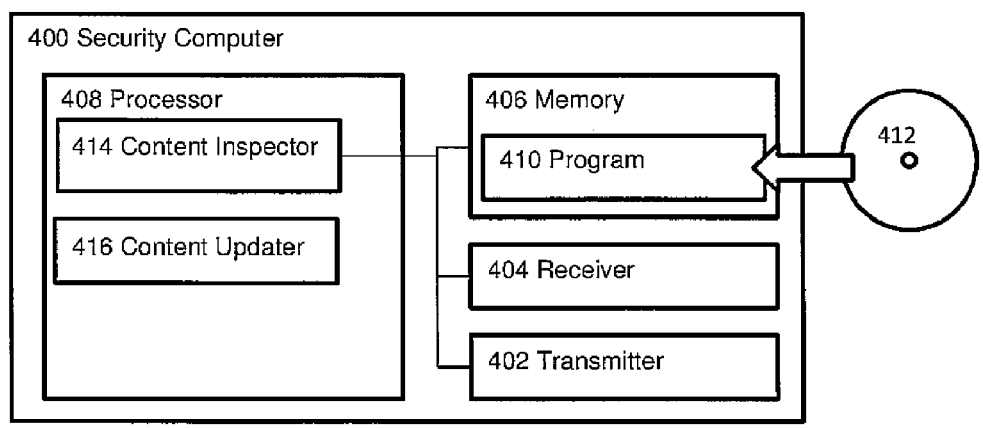
FIG. 4 is a block schematic diagram for a security computer.

FIG. 4 shows a block diagram displaying the exemplary security computer 400 of the system 1 of FIG. 1.

The security computer 400 transmits and receives signals from the gateway computer 200 and the client computer 300. The security computer 400 may also relay signals between the network 100, the gateway computer 200 and the client computer 300. The security computer 400 may be an intermediary between two entities of a system.

Other exemplary security computers may be in electrical communication with a plurality client computers and/or may be capable of serving a plurality of client computers. Other exemplary security computers may be in electrical communication with a plurality of networks and/or may be capable of communicating with a plurality of networks.

The security computer 400 comprises a transmitter 402 and a receiver 404. The transmitter 402 and receiver 404 may be in electrical communication with other communication units, user equipments, servers and/or functions in the network 100, and are configured to transmit and receive data accordingly.

The security computer 400 preferably comprises user interface (not shown) which assists a user in customizing its functionality and/or its stored content.

The security computer 400 further comprises a memory 406 and at least one processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake at least the functions of a content inspector unit 414 and a content updater unit 416 as set out below.

Each of the transmitter 402 and receiver 404, memory 406, processor 408, content processor unit 414 and content updater unit 416 is in electrical communication with the other features 402, 404, 406, 408, 410, 414 and 416 of the security computer 400.

The security computer 400 can be implemented as a combination of computer hardware and software. In particular, the content processor unit 414 may be implemented as software configured to run on the processor 408. The memory 406 stores the various programs/executable files that are implemented by a processor 408, and also provides a storage unit for any required data. The programs/executable files stored in the memory 406, and implemented by the processor 408, can include the content inspector unit 414 and content updater unit 416, but is not limited to such.

The security computer 400 may comprise various functionalities in addition to the content inspector unit 414 and content updater unit 416. The client computer 400 may be configured for multiple different purposes. The term "security computer" is not to be construed as a limitation. The security computers may be personal computers, business servers, portable computers or any other type of computers. The security computer can be any computer configured according to the method and systems described herein. Further, the functionality of the security computers described herein may be distributed on multiple system entities.

Figure 5:
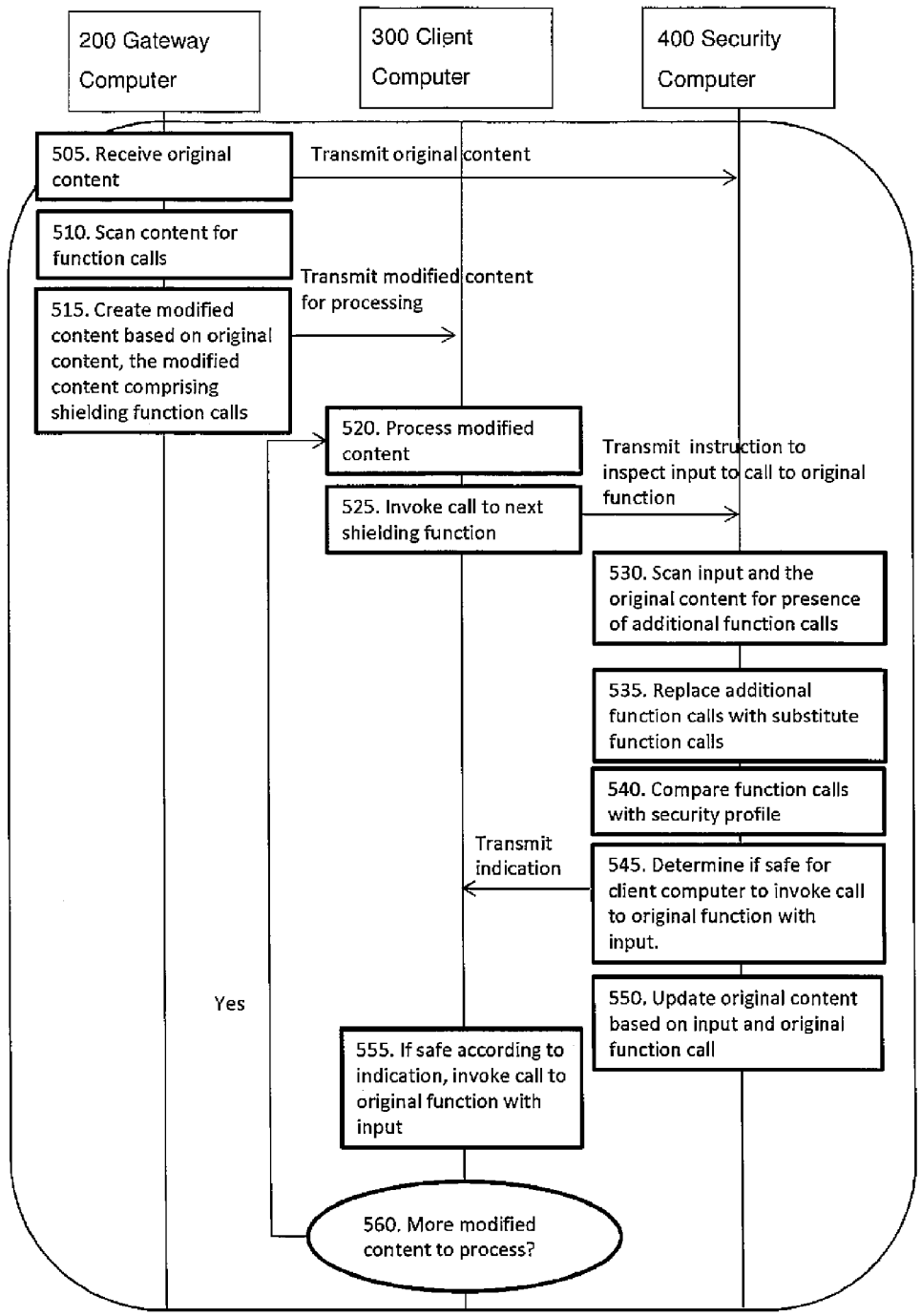
FIG. 5 is a signal flow diagram for an exemplary method and system for detecting and protecting against malicious content.

FIG. 5 shows a system flow diagram displaying an exemplary process for detecting and protecting against malicious content. The exemplary process will be described below with reference to FIG. 5.

The exemplary process shown in FIG. 5 is carried out within the system 1 as shown in FIG. 1, by way of example. FIG. 5 displays processing steps and signalling involved in the exemplary process. The figure also shows where each processing step takes place and the origin and destination of each signal that is transmitted. The leftmost column of FIG. 5 shows steps performed by the gateway computer 200 of the system 1. The middle column of FIG. 5 shows steps performed by the client computer 300 of the system 1. The rightmost column of FIG. 5 shows steps performed by the security computer 400 of the system 1.

The skilled person will appreciate that the exemplary process described herein could be carried out within other exemplary systems that comprise a gateway computer, a client computer and a security computer. The skilled person will also appreciate that some of the processing and signalling steps disclosed could be carried out at different nodes and/or additional nodes within a system without departing from the teaching of this description.

At step 505, the gateway computer 200 receives original content from a network. The original content may be intended for delivery to the client computer 300. Such content may be in the form of a HyperText Markup Language (HTML) web page or JavaScript, but may be any content that can be processed by a computer.

Once the gateway computer 200 has received the original content, it transmits a copy of the original content to the security computer 400. The gateway computer 200 does not modify the original content before transmitting it to the security computer 400. The security computer 400 receives the original content at its receiver 404. The security computer 400 stores the original content in its memory 406. The security computer 400 may adapt its runtime environment based on the original content.

At step 510, the content modifier unit 214 at the gateway computer 200 scans the original content for the presence of calls to functions. Calls to functions each comprise an associated input. The content modifier unit 214 also scans for inputs associated with the calls to functions. Calls to functions present in the original content are identified by the content modifier unit 214. Calls to functions present within the original content will be referred to as calls to original functions.

If there are calls to original functions detected at step 510 by the gateway computer 200 then at step 515 the content modifier unit 214 of the gateway computer 200 modifies the original content to produce modified content. The modified content comprises calls to shielding functions in addition to calls to the original functions, which may comprise at least a portion of the original content. The modified content may comprise all of the original content. The original content included in the modified content may be the same as the original content first received at the receiver 204 of the gateway computer 200. Alternatively, the original content included in the modified content may only be a subset of the original content first received at the receiver 204 of the gateway computer 200. The original content included the modified content may only comprise certain data and calls to functions. The original content included the modified content may have been modified or updated. For the sake of brevity, the original content included the modified content will be referred to as original content. The skilled person will understand that the original content included in the modified content may or may not be an exact copy of the original content first received by a gateway computer.

Each shielding function is operable, upon being invoked by a client computer, to transmit the input associated with a call to an original function to a security computer for inspection. If calls to original functions are not detected at step 510 by the content modifier unit 214 of the gateway computer 200, then modified content that is merely a copy of the original content may be created by the content modifier unit 214. It is of note that if no calls to original functions are identified in the original content and no malicious content is detected by the gateway computer, the modified content may be transmitted to the client computer 300 for processing and the security computer 400 will not be utilised.

For the purpose of describing the exemplary process shown in FIG. 5, it will be assumed hereinafter that the content modifier unit 214 of the gateway computer 200 identifies a plurality of calls to original functions, unless specified otherwise. It will also be assumed that the content modifier unit 214 implements a plurality of calls to shielding functions in the resultant modified content, unless specified otherwise.

The modified content is transmitted by the transmitter 204 at the gateway computer 200 to the client computer 300. Effectively, the gateway computer 200 operates as a computer which "shields" the client computer 300. Upon receiving original content, the content modifier unit 214 identifies any calls to functions that may or may not relate to malicious content within the original content, or that may or may not contribute towards the generation of malicious content during runtime in the client computer 300. The content modifier unit 214 implements any calls to shielding functions in the modified content. The modified content comprises the original content and the calls to the original functions.

The shielding functions are intended to add a line of defence to the client computer 300 against any malicious content. The shielding functions are each associated typically with a single call to an original function. Each call to a shielding function is associated with a call to an original function. Each shielding function is operable to prevent the client computer 300 from invoking a call to an original function. Each shielding function is operable to cause the client computer 300 to transmit an instruction to the security computer 400 to determine whether it is safe for the client computer 300 to invoke the call to an original function. The shielding function is also operable to cause the client computer 300 to transmit an instruction to the security computer 400 to send an indication back to the client computer 300 on whether it is safe for the client computer 300 to invoke the call to an original function. The shielding functions may be operable to suspend processing of the modified content by the content processor 314. The shielding functions may also be operable to cause processing of the modified content by the content processor 314 to be resumed if it is deemed safe to do so. If it is safe to invoke the call to the original function, the shielding function may cause the call to its associated original function in the modified content to be invoked by the client computer 300.

At step 520, the receiver 304 of the client computer 300 receives the modified content. The content processor 314 of the client computer 300 begins to process the modified content.

At step 525, the content processor 314 will encounter a call to a shielding function when processing the modified content. The call to the shielding function will be associated with a call to an original function present in the original content. Upon invoking the call to the shielding function, the content processor 314 of the client computer 300 causes its transmitter 302 to transmit an instruction to the security computer 400 to inspect the input associated with the call to the original function. The content processor 314 of the client computer may also cause an instruction to be transmitted to the security computer 400 for it to determine and indicate to the client computer 300 whether it is safe for the client computer 300 to invoke the call to the original function. The instruction may specify that the determination is to be based on the original content and the input associated with the call to the original function. The content processor 314 may cause the input associated with the original function call to be transmitted to the security computer 400 by the transmitter 302. The input may be transmitted for inspection with the original content already present in the memory 406 on the security computer 400.

At step 525, the content processor 314 may suspend processing of the modified content. The processing may be suspended pending scanning of the input associated with the original function call by the security computer 400. The processing may be suspended pending the receiver 304 of the client computer 300 receiving an indication from the security computer 400 on whether it is safe for the client computer 300 to invoke the call to the original function.

At step 525, the transmitter 302 may also transmit an identifier that identifies the client computer 300 to the security computer 400. The security computer 400 may serve multiple client computers and so the identifier may be necessary in order for the content inspector unit 414 to scan correctly the input associated with the call to the original function. The identifier may also indicate to the transmitter of the 402 of the security computer 400 where to transmit any indications on the safety of calls to functions.

The content processor 314 of the client computer 300 may scan the input associated with the call to the original function for the presence of calls to additional functions or any dynamically generated function calls resulting from the input.

Determining what content is sent from the client computer 300 to the security computer 400 can depend on the original and/or modified content itself. Updated original content may include updated files on a disk of a client computer, updated registry entries, changes in the process and system memory of a client computer or any other update or modification to the state of a client computer.

In exemplary methods and apparatus, an HTML form may be used with a JavaScript that adds a new field to the HTML form. The new HTML field is then at least part of the modified content along with other fields that may be filled by a user before pressing the submit button.

```
<form action="our_security_check( );" method="post"
name="example_form">
Firstborn:<br>
<input type="text" name="firstborn" value="Toivo">
<br>
Lastborn:<br>
<input type="text" name="lastborn" value="Rauha">
<br><br>
<input type="submit" value="Submit">
</form>
<script>
function addInput(theForm, key, value)
{
    var input = document.createElement('input');
    input.type = 'text';
    input.name = key;
    input.value = value;
    theForm.appendChild(input);
```

-continued

```
}
// Form reference:
var theForm = document.forms['example_form'];
// Add data:
addInput(theForm, 'middleborn',
'UGllbmkgcmFrYXMgZW5rZWxpbW1l');
</script>
```

At step 530, the receiver 404 at the security computer 400 receives the instruction from the client computer 300 to inspect the input associated with the call to the original function. The receiver 404 may receive an instruction for the security computer 400 to determine and indicate to the client computer 300 whether it is safe for the client computer 300 to invoke the call to the original function. The receiver 404 may also receive the input associated with the call to the original function. The receiver 404 may also receive an identifying the client computer 300 to the security computer 400.

In response to the instruction, the content inspector unit 414 scans the input associated with the call to the original function for the presence of additional calls to functions. The content inspector unit 414 may also scan the original function itself for the presence of additional function calls. If additional function calls are detected, the content inspector unit 414 may cause additional calls to shielding functions, each associated with one of the additional calls to functions to be implemented in the input to the call to the original function. This occurs at step 535. In exemplary methods and apparatus, this may be done in two ways. The security computer may send updated and shielded content to the client computer and the client computer updates its content accordingly, or the client computer may generate calls to new shielding functions relating to the additional function calls itself.

By implementing the additional calls to shielding functions, the input is modified in the original content. The additional calls to shielding functions may be transmitted, by the transmitter 402 of the security computer 400, to the client computer 300 for implementation in the modified content stored at the client computer 300. The additional calls to shielding may prompt the content inspector unit 414 to scan the additional calls to functions for the presence of malware.

At step 540, the content inspector unit 414 of the security computer scans the input associated with the call to the original function with its associated input, which may have been modified to comprise additional calls to shielding functions. The content inspector unit 414 scans the input for the presence of potentially malicious operations. The content inspector unit 414 may flag any operation it deems to be potentially malicious.

The content inspector unit 414 may compare, with a security policy, the content of the input that has been flagged. The security policy is stored in memory 406 on the security computer 400, or is accessible via the network 100. The security policy may comprise a list of permissible and impermissible operations that the client computer 300 should adhere to. It is determined if it is permissible for the client computer 300 to invoke the call to the original input with its associated input based on this security policy.

At step 545, a determination is made on whether it is safe for the client computer 300 to invoke the call to the original function. If the content inspector unit 414 of the security computer 400 determines that the input does not violate the security policy, the content inspector unit 414 may determine that the input is safe. If the content inspector unit 414 of the security computer 400 determines that the input does violate the security policy, the content inspector unit 414 may determine that the input is not safe. Such determination may involve the use of algorithms and/or logical tests in combination with the use of the security profile.

Once a determination has been made over whether the call to the original function with the associated input is safe, the content inspector unit 414 causes the transmitter 402 of the security computer 400 to transmit an indication to the client computer 300. The indication specifies to the client computer 300 whether it is safe for the client computer 300 to invoke the call to the original function.

If the call to the original function with the associated input is determined to be safe by the content inspector unit 414, then the content updater unit 416 of the security computer 400 may invoke the call to the original function present in the original content. By invoking the call to the original function, the function will execute in the security computer 400. The original function, when called with its associated input, may cause the original content stored in the security computer to be changed. The content updater unit 416 determines updates for the original content stored in memory on the security computer 400. When invoked, the original function may cause inputs associated with calls to other original functions to be updated. By invoking the call to the original function, the content updater unit 416 may determine such updates. The original function, when called with its associated input, may also cause changes to occur more generally in the runtime environment of the security computer 400. For example, the original function may change the values of global variables residing in the runtime environment of the security computer 400. The content updater unit 416 may record any changes in the runtime environment of the security computer 400 in response to invoking a call to an original function.

In other exemplary security computers, a content updater unit may not necessarily invoke a call to an original function present in original content, but instead determine updates based on the call and associated input to the original function. The content inspector unit may attempt to emulate, in a security computer, any effects of invoking the call to the original function in a client computer.

At step 525, the receiver 304 of the client computer 300 receives an indication on whether it is safe for the client computer 300 to invoke the call to the original function. Depending on whether or not the indication specifies whether it is safe or not for the client computer 300 to invoke the call to the original function the operations of the client computer 300 branch.

If the indication specifies that it is not safe for the client computer 300 to invoke the call, the content processor 314 may cause the suspension of processing of the modified content in the client computer 300 to continue. The content processor 314 may cause the termination of the processing of the modified content at the client computer 300. Alternatively, the content processor 314 may cause processing of the modified content in the client computer 300 to resume, but without invoking the call to the original function. In the latter scenario, the process may skip to step 560. Step 560 will be described in more detail below. In some exemplary systems, any calls to functions that are specified as not safe to invoke may be modified so as to be made benign. That is, a call to a function, an associated input or the function itself may be modified such that any malicious components be removed, modified or replaced. For example if an original function is operable to visit malicious URL, the input associated with the function can be modified to point to a website that warns the user. In such exemplary systems it may be safe to invoke a call to an original function if it, an associated input or the function itself has been rendered benign. A client computer, a gateway computer or a security computer may be configured to modify original content to render any call to an original function that is initially not safe to invoke. A client computer, a gateway computer or a security computer may be configured to modify original content to render any call to an original function benign.

The content processor 314 may cause a warning to be displayed on a user interface available to a user of the client computer 300. The warning may state that the content being processed by the client computer 300 may comprise malicious content. The content processor 314 may cause a variety of options as outlined above to be displayed to the user on how he/she wishes the client computer 300 to proceed with the processing of the modified content. A user input may be present to allow a user to select one of the above options. Processing of the modified content may continue to be suspended until an option has been selected by the user.

If the indication received by the client computer 300 specifies that it is safe to invoke the call, the content processor 314 may cause the resumption of processing of the modified content in the client computer 300. In response to receiving the indication from the security computer 400 that it is safe for the client computer 300 to invoke the call to the original function, the content processor 314 invokes the call to the original function.

By invoking the call to the original function with its associated input, the content processor 314 may cause the modified content stored in memory 306 of the client computer 300 to be updated. More generally, the runtime environment of the client computer 300 may be changed as a result of the original function being executed by the content processor 314. Such changes to the runtime environment of the client computer can also be referred to as updates to the runtime environment of the client computer 300. For example, global variables may be changed and executable scripts may be generated or altered in the client computer's memory 306. Updates to the original content present on the client computer 300 may be generated. Updated original content may be determined by the content processor 314. Updated modified content may be determined by the content processor 314.

The content processor 314 of the client computer 300 may determine whether any additional function calls or any dynamically generated function calls are present in updated original content. If additional function calls or any dynamically generated function calls are present in the updated original content, the content processor 314 may add corresponding shielding function calls to the updated original content. The content processor 314 of the client computer 300 may determine whether any additional function calls or any dynamically generated function calls are present in updated modified content. If additional function calls or any dynamically generated function calls are present in the updated modified content, the content processor 314 may add corresponding shielding function calls to the updated modified content. The client computer 300 may be configured to receive shielding functions for any additional function calls or any dynamically generated function calls in updated original or modified content from the security computer 400. The client computer 300 may be configured to implement the shielding functions in the modified content stored in its memory 306.

At step 555, the transmitter 302 of the client computer 300 may transmit updated original content to the security computer 400 (not shown in FIG. 5). The transmitter 302 may transmit updates to the runtime environment of the client computer 300 to the security computer (not shown in FIG. 5).

Upon receiving updated original content at the receiver 404, the content updater unit 416 may scan the received updated original content to see if it differs from the updated original content it has determined. If there are differences between the two sets of updated original content, the content updater unit 416 may determine new updates to implement in original content stored in memory 406 on the security computer 400. Differences between the two sets of updated original content may be a signature of malicious content. Differences between the two sets of updated original content may be a signature of malicious content targeted to overcome pro-active anti-malware applications. In response to identifying differences between the two sets of updated original content, the content updater unit 416 may refer the differences to the content inspector unit 414 for inspection. The content inspector unit 414 may analyse the original content based on the differences in the two sets of updated original content. The analysis of the original content may lead to a determination on whether the differences in the two sets of updated original content is due to the presence of malicious content.

One purpose of determining new updates to the original content is to ensure that the runtime environment of the client computer 300, the operations of the client computer 300 and the original content being processed in the client computer 300 is emulated accurately by the security computer 400. The receiver 404 of the security computer 400 may also receive updates to the runtime environment of the client computer 300. The content updater unit 416 may implement the updates to runtime environment of the client computer 300 on the security computer 400. Again, by implementing the updates to the runtime environment of the client computer 300 on the security computer 400, the security computer 400 may be able to more accurately emulate the runtime environment of the client computer 300, the operations of the client computer 300 and the original content being processed on the client computer 300.

If the content updater unit 416 of the security computer 400 has not invoked the call to the original function itself and/or has not determined any updates to the original content based on the original function, then it may implement any received updated original content in original content stored in memory 406 in the security computer 400. If the content updater unit 416 of the security has not invoked the call to the original function itself and/or has not determined any updates to its runtime environment based on the original function, then it may implement any received updates to the runtime environment of the client computer 300 in the security computer 400. In some exemplary systems, the security computer may be configured not to determine any updates itself, but to receive any updated content from a client computer so that it can emulate accurately the runtime environment, the operations and the original content being processed in relation to that client computer. In other exemplary systems, the security computer may determine all updated content in order to emulate the runtime environment, the operations and the original content being processed of a client computer. The client computer may not transmit any updated content to the security computer. Some exemplary systems may be configured such that some updated content is determined by a security computer and the remaining updated content is transmitted from a client computer to the security computer.

At step 560, the content processor 314 of the security computer 300 will determine if there is more of the modified content in the client computer 300 to process. If there is more modified content to process, the content processor 314 will continue to process the modified content in accordance with step 520 of FIG. 5. In other words, the process will loop back to step 520. The content processor 314 may encounter a call to a second shielding function. The call to the second shielding function will be associated with another call to an original function present in the original content in the client computer 300. The original content now is the original content as updated after invoking the call to the previous original function (associated with the call to the previous shielding function). The runtime environment of the client computer 300 may be different at this step, as it may have been after the content processor 314 of the client computer 300 invoked the call to the previous original function.

If it is determined by the content processor 314 at step 560 that there is no more modified content to process, the content processor can be configured to close any program instance associated with the modified or original content. The content processor 314 may cause the transmitter 302 to transmit a notification to the gateway computer 200 that processing of the modified content is complete. The content processor 314 may cause the transmitter 302 to transmit a notification to the security computer 400 that processing of the modified content is complete.

Until it is determined by the content processor 314 at step 560 that there is no more modified content to process, the process shown in FIG. 5 will loop back to step 520. Each call to the shielding function present in the modified content will be invoked in series. The calls to original functions present in the original content and associated with the calls to the shielding function in the modified content will also be handled in series.

Figure 5A:
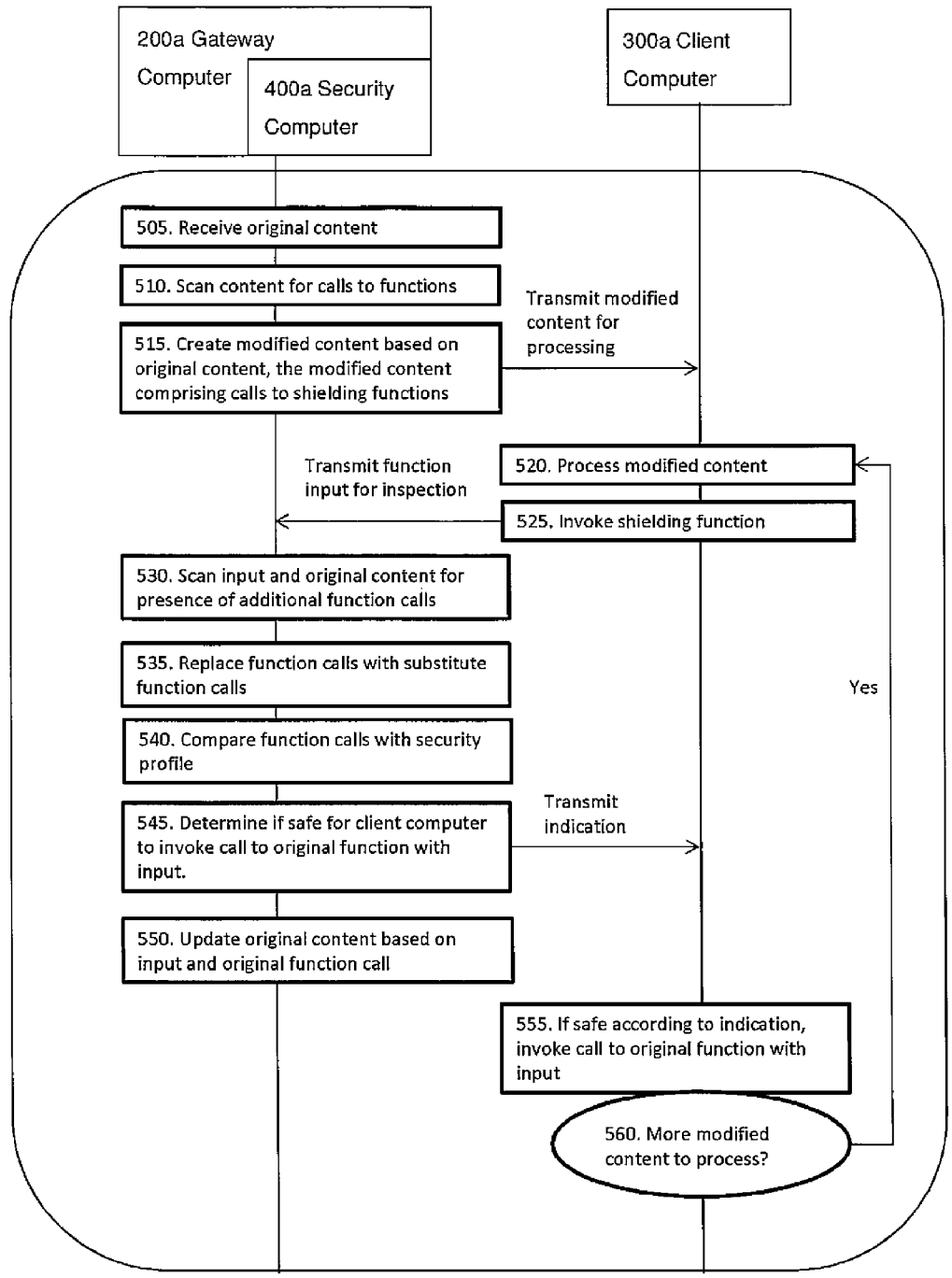
FIG. 5a is another signal flow diagram for another exemplary method and system for detecting and protecting against malicious content.

FIG. 5a shows a system flow diagram displaying another exemplary process for detecting and protecting against malicious content.

The exemplary process shown in FIG. 5a is carried out within the system 1a as shown in FIG. 1a, by way of example. FIG. 5a displays processing steps and signalling involved in the exemplary process. The figure also shows where each processing step takes place and the origin and destination of each signal that is transmitted. The left column of FIG. 5a shows steps performed by the gateway computer 200a of the system 1a. The right column of FIG. 5a shows steps performed by the security computer 400a of the system 1a.

In accordance with FIG. 1a, the gateway computer 200a of system 1a includes some of the functionality of the security computer 200 of system 1. The gateway computer 200a comprises a content inspector unit and a content updater unit. The exemplary process of FIG. 5a is similar to the exemplary process of FIG. 5. However, because the functionality of a security computer 200a has been combined with a gateway computer 200a, less communication is required for detecting and protecting against malicious content.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A gateway computer for protecting a client computer against dynamically generated malicious content, the gateway computer comprising:
    a receiver configured to receive original content, the original content comprising a call to an original function, the call including an associated input;
    a content modifier unit configured to modify the original content to produce modified content, wherein the modified content includes a call to the original function and a call to a shielding function, the shielding function being operable to cause the client computer to transmit an instruction to a security computer to inspect the input associated with the call to the original function; and
    a transmitter configured to transmit the original content to the security computer and to transmit the modified content to the client computer, thereby allowing, based on the original content, detection of dynamically generated malicious content.

2. The gateway computer of claim 1, wherein the shielding function in the modified content is operable to cause processing of the modified content in the client computer to be suspended prior to invoking the call to the original function.

3. The gateway computer of claim 1, wherein the shielding function in the modified content is operable to cause the client computer to transmit an instruction to the security computer to determine and indicate to the client computer whether it is safe for the client computer to invoke the call to the original function, the determination being based on the original content and the input associated with the call to the original function.

4. The gateway computer of claim 3, wherein the shielding function in the modified content is operable to cause the client computer to transmit to the security computer the input associated with the call to the original function.

5. The gateway computer of claim 4, wherein the shielding function in the modified content is operable to cause the client computer, in response to receiving an indication from the security computer that it is safe for the client computer to invoke the call to the original function, to resume processing of the modified content.

6. The gateway computer of claim 1, wherein the modified content is operable, to cause the client computer to transmit updated original content to the security computer.

7. The gateway computer of claim 1, wherein the original content comprises calls to a plurality of original functions, and the modified content is operable to cause the client computer to transmit updated original content to the security computer following a call to one of the plurality of original functions.

8. A security computer for detecting dynamically generated malicious content comprising:
    a receiver configured to receive original content from a gateway computer, the original content comprising a call to an original function, the call including an associated input;
    a memory for storing the original content;

a content inspector unit configured, based on the original content and the input associated with the call to the original function, to determine whether it is safe for a client computer to invoke the call to the original function; and a transmitter configured to transmit an indication to the client computer specifying whether it is safe for the client computer to invoke the call to the original function.

9. The security computer of claim 8, further comprising a content updater unit configured, based the call to the original function and the original content, to determine updated original content.

10. The security computer of claim 8, wherein the receiver is further configured to receive updated original content from the client computer following the call to the original function.

11. The security computer of claim 10, wherein the content inspector unit is further configured to determine whether any additional function calls or any dynamically generated function calls are present in updated original content and, if additional function calls or any dynamically generated function calls are present, to add corresponding shielding function calls to the updated original content.

12. The security computer of claim 11, wherein the content inspector unit is further configured, based on the updated original content and an input associated with a call to another original function, to determine whether it is safe for the client computer to invoke the call to the other original function.

13. The security computer of claim 10, wherein the content inspector unit is configured to determine whether there are any differences between updated original content received from the client computer and updated original content determined by the content modifier unit.

14. A method for operating a gateway computer for protecting a client computer against dynamically generated malicious content comprising:

receiving, at a receiver, original content, the original content comprising a call to an original function, the call including an associated input;

modifying, at a content modifier unit, the original content to produce modified content, wherein the modified content includes a call to the original function and a call to a shielding function, the shielding function being operable to cause the client computer to transmit an instruction to a security computer to inspect the input associated with the call to the original function; and transmitting, at a transmitter, the original content to the security computer and transmitting the modified content to the client computer, thereby allowing, based on the original content, detection of dynamically generated malicious content.

15. The method of claim 14, wherein the shielding function in the modified content is operable to cause the client computer, in response to receiving an indication from the security computer that it is safe for the client computer to invoke the call to the original function, to resume processing of the modified content.

16. The method of claim 14, wherein the modified content is operable to cause the client computer to transmit updated original content to the security computer.

17. The method of claim 14, wherein the original content comprises calls to a plurality of original functions, and the modified content is operable to cause the client computer to transmit updated original content to the security computer following a call to one of the plurality of original functions.

18. A method for operating a security computer for detecting dynamically generated malicious content comprising:

receiving, at a receiver, original content from a gateway computer, the original content comprising a call to an original function, the call including an associated input;

storing, in a memory, the original content;

determining, at a content inspector unit, based on the original content and the input associated with the call to the original function, whether it is safe for a client computer to invoke the call to the original function; and transmitting, at a transmitter, an indication to the client computer specifying whether it is safe for the client computer to invoke the call to the original function.

19. The method of claim 18, further comprising receiving, at the receiver, an instruction from the client computer to determine whether it is safe for the client computer to invoke the call to the original function.

20. The method of claim 18, further comprising determining, at a content updater unit, updated original content based the call to the original function and the original content, the updated original content being based on a call to the original function.

21. The method of claim 18, further comprising receiving, at the receiver, updated original content, based on a call to the original function, from the client computer.

22. The method of claim 18, wherein the original content comprises calls to a plurality of original functions and the method further comprises receiving, at the receiver, updated original content from the client computer following a call to one of the plurality of original functions.

23. The method of claim 18, further comprising determining, at the content inspector unit, whether any additional function calls or any dynamically generated function calls are present in updated original content, based on a call to the original function, and, if additional function calls or any dynamically generated function calls are present, adding corresponding shielding function calls to the updated original content.

24. The method of claim 22, further comprising determining, at the content inspector unit, whether there are any differences between updated original content received from the client computer and updated original content determined by the content modifier unit.

* * * * *